United States Patent [19]
Wezenberg

[11] Patent Number: 5,031,794
[45] Date of Patent: Jul. 16, 1991

[54] CONTAINER FOR ELASTIC SOLID MATERIAL

[75] Inventor: Paulus A. Wezenberg, Rotterdam/Pernis, Netherlands

[73] Assignee: Shell Research Limited, London, England

[21] Appl. No.: 555,598

[22] Filed: Jul. 23, 1990

[30] Foreign Application Priority Data

Aug. 1, 1989 [GB] United Kingdom ............... 8917578

[51] Int. Cl.[5] .............................................. B65D 21/00
[52] U.S. Cl. ................................... 220/4.28; 220/1.5; 220/4.33; 220/7; 403/325
[58] Field of Search ................... 220/4, 6, 7, 1.5, 691, 220/324, 4.28, 4.33; 403/325

[56] References Cited

U.S. PATENT DOCUMENTS

| | | | |
|---|---|---|---|
| 2,284,180 | 5/1942 | Thomas | 403/DIG. 4 X |
| 3,973,692 | 8/1976 | Cloyd | 220/7 |
| 4,088,238 | 5/1978 | Berwald et al. | 220/1.5 |
| 4,178,651 | 12/1979 | Mayer | 403/325 X |
| 4,653,659 | 3/1987 | Bersani | 220/6 X |

Primary Examiner—Steven M. Pollard
Attorney, Agent, or Firm—Jones, Tullar & Cooper

[57] ABSTRACT

A container for elastic solid material, comprising connecting means for detachably connecting adjacent walls of the container. The connecting means include a protrusion attached to a first wall and a guiding element attached to a second wall adjacent to the first wall. The guiding element is provided with an opening through which the protrusion is extendable. A locking element is provided for locking the protrusion in the opening of the guiding element by means of a spring action of the locking element. The spring action can be deactivated by a displacement of the locking element against the spring action.

5 Claims, 2 Drawing Sheets

CONTAINER FOR ELASTIC SOLID MATERIAL

The invention relates to a container for elastic solid material. Elastic solid material, such as rubber, is generally transported from a factory to a customer in the form of a bale packed inside a wooden container. In the period of time between packing the bale in the container and unpacking the bale from the container the elastic solid material may have undergone some deformation, e.g. due to thermal expansion or due to gravitational forces. Such a deformation can lead to an increased pressure between the bale of elastic solid material and the walls of the container. Removing the bale from the container at the customer is then difficult and can normally not be done without disassembling the container in a destructive manner.

An object of the invention is to provide a container for solid elastic material which can be easily unpacked in a non-destructive manner, even when there is an increased pressure between the bale of elastic solid material and the walls of the container.

To this end the container according to the invention comprises connecting means for detachably connecting adjacent walls of the container. The connecting means includes a protrusion attached to a first wall, a guiding element attached to a second wall adjacent to the first wall, which guiding element has an opening through which the protrusion is extendable, and a locking element for locking the protrusion in the opening of the guiding element by means of a spring action of the locking element, which spring action can be deactivated by a displacement of the locking element against the spring action.

During transportation from the factory to the customer, the spring action of the locking element prevents premature disconnection of the walls. Unpacking at the customer is easily performed by displacing the locking element against the spring action thereby allowing the protrusion to be removed from the opening of the guiding element. In this manner the adjacent walls are disconnected from each other, and thus the bale can be removed from the container. Once disconnected the walls of the container can be transported back to the factory in the form of a flat package requiring only a limited space.

Advantageously, the locking element is connected to the second wall and is extendable into a recess of the protrusion by means of the spring action of the locking element so as to lock the protrusion in the opening of the guiding element. The locking element extends automatically into the recess of the protrusion as a result of the spring action, when the protrusion is extended through the opening of the guiding element.

More advantageously the protrusion comprises a pin having a diameter corresponding to a diameter of the opening of the guiding element. Radial movement of the pin in the opening of the guiding element is thus prevented.

More advantageously the pin comprises a middle-section having a reduced diameter, which middle-section defines the recess. The recess in the form of a middle-section of reduced diameter allows the locking element to extend into the recess irrespective of the angular orientation of the locking element relative to the pin.

More advantageously a wall of an opening in the locking element is extendable into the recess of the pin so as to lock the pin in the opening of the guiding element, the openings of the guiding element and the locking element being un-aligned when the pin is locked in the opening of the guiding element. Unlocking of the pin from the guiding element can easily be accomplished by displacing the locking element against its spring action so that the openings of the guiding element and the locking element become aligned.

The invention will now be described by way of example in more detail with reference to the accompanying drawings, in which.

Figure 1:
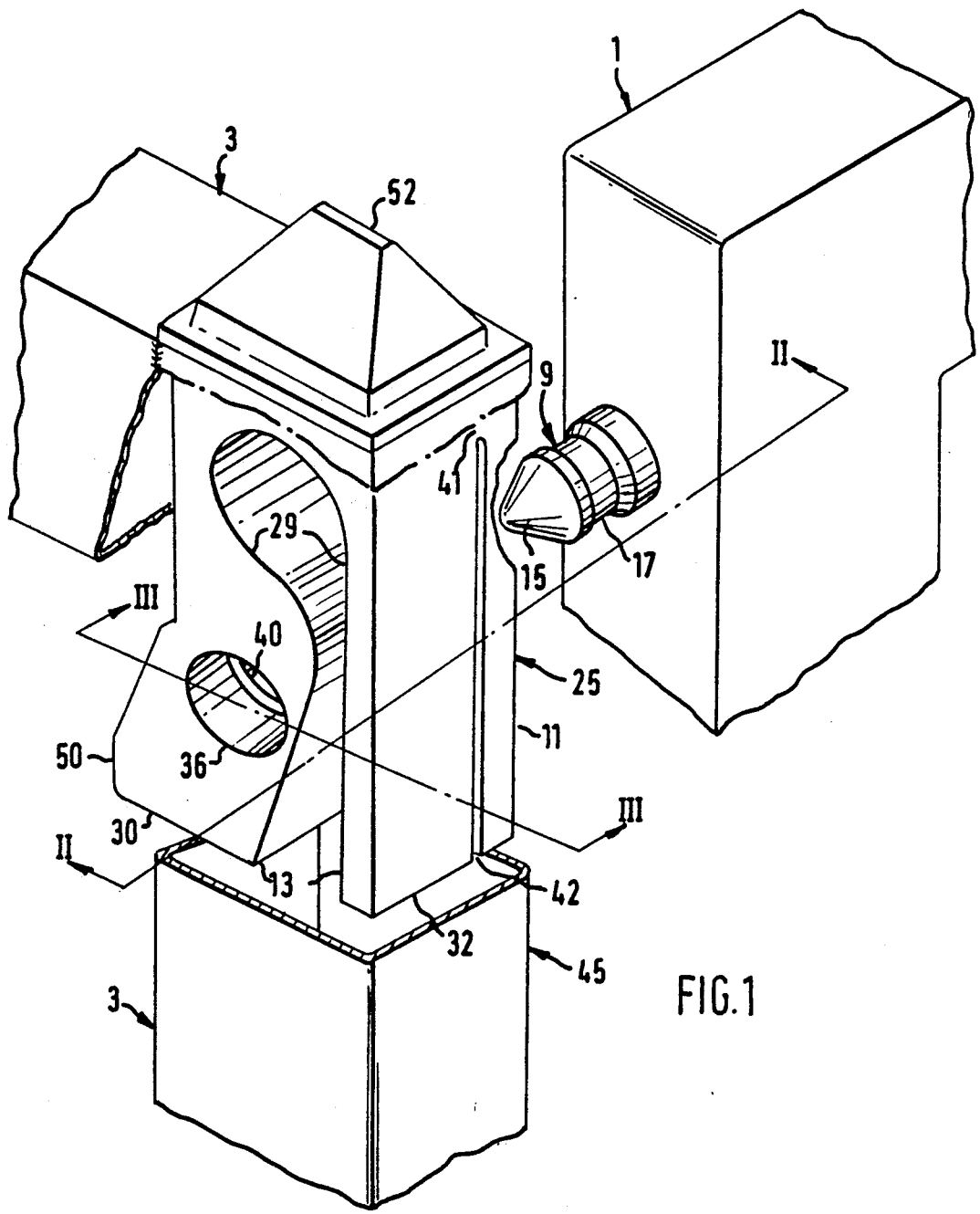
FIG. 1 shows a schematic perspective view of a corner of a container according to the invention, in a disassembled mode.
Figure 2:
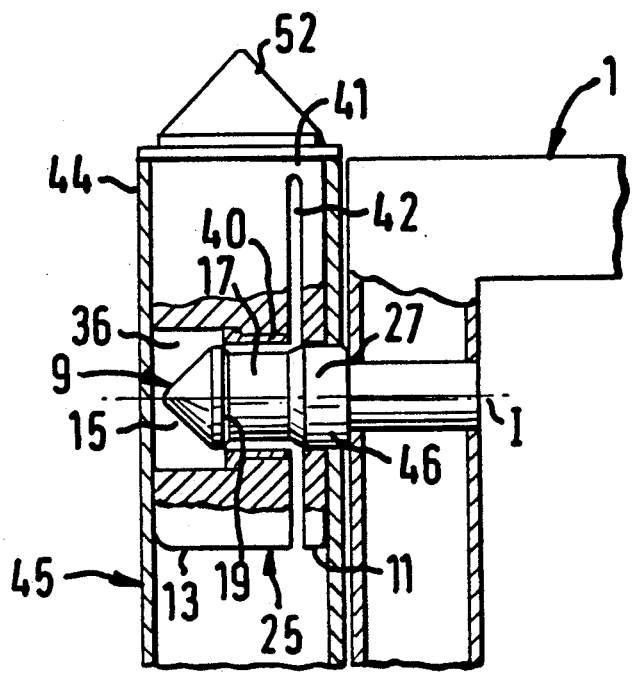
FIG. 2 shows cross-section II—II of the container of FIG. 1, in assembled mode.
Figure 3:
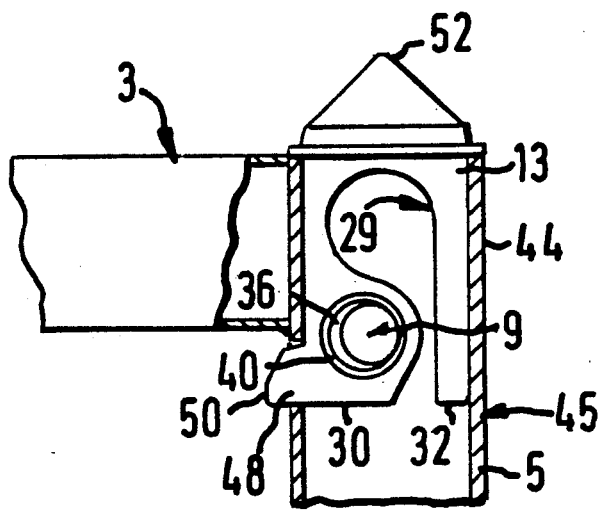
FIG. 3 shows cross-section III—III of the container of FIG. 1, in the assembled mode.

The container shown in FIGS. 1–3 comprises a first wall 1 and a second wall 3 perpendicular and adjacent to the first wall 1.

The two walls 1, 3 are detachably connected to each other by connecting means in the form of a pin 9 connected to the first wall 1, a guiding element 11 and a locking element 13, both elements 11, 13 being connected to the second wall 3. The guiding element 11 and the locking element 13 form a corner of the second wall 3.

The pin 9 has a conical end portion 15 and a recess 17 in the form of a middle-section of reduced diameter.

The guiding element 11 and the locking element 13 are integrally manufactured as a guiding/locking unit 25 made of plastic such as polyethylene or Delrin (Registered Trade Mark).

The guiding element 11 has an opening 27 (FIG. 2) having a diameter corresponding to the largest diameter of the pin 9, through which opening 27 the pin 9 is extendable.

The locking element 13 comprises a U-shaped body 29 having a first leg 30 and a second leg 32, which first leg 30 is elastically displaceable towards the second leg 32. The first leg 30 has an opening 36 through which the pin is extendable, the wall of the opening 36 being partly formed by an inner wall of a metal bushing 40 provided in the first leg 30. The inner diameter of the bushing 40 corresponds with the largest diameter of the pin 9, and the length of the bushing 40 corresponds with the length of the recess 17 of the pin 9. The opening 27 of the guiding element 11 and the opening 36 of the first leg 30 of the U-shaped body 29 are un-aligned.

A connection between the guiding element 11 and the locking element 13 located is at a central portion 41 of the U-shaped body 29, and a slit 42 extends between the guiding element 11 and the legs 30, 32 of the U-shaped body 29.

The guiding/locking unit 25 is arranged inside a sheath 44 of a frame 45 provided in the second wall 3, which sheath 44 has a first opening 46 (FIG. 2) for access of the pin 9 to the openings 27, 36 of the guiding element 11 and the locking element 13. A second opening 48 (FIG. 3) is arranged in the sheath 44, in which second opening 48 a part 50 of the first leg 30 of the U-shaped body 29 extends so as to hold the guiding-/locking unit 25 in place and to provide access to the first leg 30 for pushing the first leg 30 towards the second leg 32. The guiding/locking unit 25 is at its upper end provided with a tapered portion 52 which extends beyond the walls 1, 3, and which tapered portion 52 fits in a recess of a similar container (not shown) so as to allow a plurality of containers to be stacked upon each other.

During assembling of the container according to the invention, the first wall 1 and the second wall 3 are oriented perpendicular to each other whereby the pin 9 is inserted into the first opening 46 of the sheath 44, into the opening 27 of the guiding element 11, and into the opening 36 of the first leg 30 of the locking element 13. During the insertion of the pin 9 into the opening of the first leg 30 of the locking element 13, the conical end portion 15 of the pin 9 pushes the first leg 30 towards the second leg 32 and aligns the openings 27, 36 of the guiding element 11 and the locking element 13. When the recess 17 of the pin 9 is fully arranged in the bushing 40, the first leg 30 springs back, thereby extending the inner wall of the bushing 40 into the recess 17 of the pin 9 and locking the pin 9 in the guiding/locking unit 25. In this manner the walls 1, 3 are firmly interconnected.

During disassembling of the container according to the invention, the part 50 of the first leg 30 is pushed inward, thereby displacing the first leg 30 towards the second leg 32 and aligning the openings 27, 36 of the guiding element 11 and the locking element 13, so that the pin 9 becomes unlocked from the guiding/locking unit 25. The pin 9 is then removed from the guiding-/locking unit 25, thereby detaching the first wall 1 from the second wall 3.

It will be appreciated by those skilled in the art that any material suitable for the purpose can be applied as a construction material for the container of the present invention. For example steel can be applied. In particular, the application of plastic containers is considered advantageous as their weight is about ⅓ of the weight of steel containers. In advantageous embodiments of the present invention fibre reinforced polyester or epoxy resin are applied as a construction material for the container.

Further, it will be appreciated by those skilled in the art that the containers of the invention can be piled up one upon another. In an advantageous embodiment of the invention the (plastic) containers can be piled up one upon another to a total number of 6 containers one upon another.

Various modifications of the present invention will become apparent to those skilled in the art from the foregoing description. Such modifications are intended to fall within the scope of the appended claims.

I claim:

1. A container for elastic solid material, comprising connecting means for detachably connecting adjacent walls of the container, said connecting means including:
   a protrusion connected to a first wall;
   a guiding element connected to a second wall adjacent to the first wall, which guiding element has an opening through which the protrusion is extendable; and
   a locking element for locking the protrusion in the opening of the guiding element by means of a spring action of the locking element, which spring action can be deactivated by a displacement of the locking element against said spring action, wherein the locking element is connected to the second wall and is extendable into a recess of the protrusion so as to lock the protrusion in the opening of the guiding element, said protrusion comprising a pin having a diameter corresponding to a diameter of the opening of the guiding element, said pin having a conical end portion, and comprising a middle-section having a reduced diameter, which middle-section defines the recess, wherein a wall of an opening in the locking element is extendable into the recess of the pin so as to lock the pin in the opening of the guiding element, the openings of the guiding element and the locking element being un-aligned when the pin is locked in the opening of the guiding element, wherein said wall of the opening in the locking element comprises an inner wall of a metal bushing provided in the locking element, and wherein the locking element comprises a U-shaped body having a first leg and a second leg, the opening of the locking element being provided in the first leg, which first leg is elastically displaceable towards the second leg so as to align the openings of the guiding element and the locking element.

2. The container as claimed in claim 1, wherein the U-shaped body and the guiding element are integrally made as a guiding/locking unit.

3. The container as claimed in claim 2, wherein the guiding/locking unit is made of plastic.

4. The container as claimed in claim 2 or 3, wherein the guiding/locking unit is arranged inside a sheath of a frame provided in the second wall.

5. The container as claimed in claim 4, wherein the sheath has an opening through which a part of the first leg of the U-shaped body extends thereby holding the guiding/locking unit in place and providing access to the first leg for displacing the first leg towards the second leg.

* * * * *